United States Patent
Yanagisawa et al.

(10) Patent No.: US 6,584,061 B2
(45) Date of Patent: Jun. 24, 2003

(54) OPTICAL PICK-UP DEVICE

(75) Inventors: Katsushige Yanagisawa, Nagano (JP); Tohru Hotta, Nagano (JP); Ikuo Kasuga, Nagano (JP); Satoru Kishita, Tokyo (JP)

(73) Assignees: Kabushiki Kaisha Sankyo Seiki Seisakusho, Nagano (JP); Kabushiki Kaisha Toshiba, Kanagawa (JP)

( * ) Notice: Subject to any disclaimer, the term of this patent is extended or adjusted under 35 U.S.C. 154(b) by 399 days.

(21) Appl. No.: 09/728,087

(22) Filed: Dec. 4, 2000

(65) Prior Publication Data

US 2001/0002896 A1 Jun. 7, 2001

(30) Foreign Application Priority Data

Dec. 2, 1999 (JP) ............................................. 11-342748

(51) Int. Cl.$^7$ ................................................. G11B 7/00
(52) U.S. Cl. ............................... 369/112.17; 369/44.23
(58) Field of Search ......................... 369/112.01, 112.05, 369/112.09, 112.17, 112.21, 112.28, 112.29, 44.23, 44.37, 94

(56) References Cited

U.S. PATENT DOCUMENTS

| | | | | |
|---|---|---|---|---|
| 5,999,509 A | * | 12/1999 | Sugiura et al. | 369/112.17 |
| 6,016,301 A | * | 1/2000 | Takasawa et al. | 369/112.17 |
| 6,125,091 A | * | 9/2000 | Kasuga | 369/112.17 |
| 6,222,812 B1 | * | 4/2001 | Yoo et al. | 369/44.23 |
| 6,285,646 B1 | * | 9/2001 | Yoo et al. | 369/112.26 |

FOREIGN PATENT DOCUMENTS

| JP | 10-112056 | 4/1998 |
|---|---|---|
| JP | 10-308031 | 11/1998 |

* cited by examiner

Primary Examiner—Thang V. Tran
(74) Attorney, Agent, or Firm—Sughrue Mion, PLLC

(57) ABSTRACT

An optical system of an optical pick-up device 1 comprises a half mirror 13 and a prism 14 which serve to guide a first laser beam L1 for a CD and a second laser beam L2 for a DVD to the optical recording medium side and a common light receiving element 19. The half mirror 13 is set to have a ratio of a reflectance to a transmittance of 5:1 in the first laser beam L1 to be a P polarized light and the prism 14 is set to have a ratio of a reflectance to a transmittance of 1:3 in the first laser beam L2 having a P polarization component and an S polarization component mixed. The first laser beam for a CD can be guided to the optical recording medium without a light quantity loss. At the same time, a return light Lr can be sent in a sufficient light quantity back to the light receiving element 19 for servo signal generation. Therefore, it is possible to implement a reliable CD recording operation by using the first laser beam.

7 Claims, 5 Drawing Sheets

OPTICAL PICK-UP DEVICE

BACKGROUND OF INVENTION

1. Field of Invention

The present invention relates to an optical pick-up device comprising a plurality of laser light sources and serving to carry out recording on an optical recording medium and reproduction of different optical recording media, and more particularly to an optical pick-up device capable of performing recording and reproducing operations with high precision by efficiently utilizing a laser beam emitted from each light source.

2. Related Art

There has been known an optical pick-up device capable of reproducing different optical recording media, for example, a CD-R/RW (Read/Read and Write) together with a CD and a DVD. For example, there has been known an optical pick-up device of a 2-light source type comprising a semiconductor laser having a wavelength of 780 nm together with a semiconductor laser having a wavelength of 650 nm or 670 nm.

In order to constitute such an optical pick-up device to be compact, one of the present applicants has proposed an optical pick-up device having such a structure that an optical system of each laser beam is shared to guide each semiconductor laser toward the optical recording medium side through a common optical system and a return light is also guided from the optical recording medium to a photodetector for information reproduction and servo signal generation through the common optical system Japanese patent Laid open No 10-112056 (Japanese Appl. No. 8-263997).

The optical pick-up device comprises a first semiconductor laser for emitting a first laser beam, a second semiconductor laser for emitting a second laser beam having a different wavelength from that of the first laser beam, an objective lens for causing the first and second laser beams to converge as light spots on an optical recording medium, a common light receiving element for receiving a return light sent from the optical recording medium, and first and second beam splitters, the first laser beam being guided to the objective lens through the first and second beam splitters, the second laser beam being guided to the objective lens through the second beam splitter and the return light being guided to the common light receiving element through the first and second beam splitters. Moreover, the first and second beam splitters have same optical characteristic in which a transmittance is set to 50% and a reflectance is also set to 50% for each laser beam.

However, the optical pick-up device thus constituted has respects to be improved. More specifically, when laser beams having different wavelengths are to be guided to the common light receiving element, the quantity of light is attenuated every time the laser beam having each wavelength is reflected by and transmitted through each beam splitter. Therefore, there is a drawback in that a light quantity loss is great as a whole of each laser beam.

In order to carry out recording on the CD-R/RW (the CD and the CD-R/RW will be generally referred to as CDs), particularly, it is necessary to reduce the light quantity loss of the laser beam for CD recording, thereby forming a light spot in a sufficient quantity of light on a CD recording plane. In the optical pick-up device having the above-mentioned structure, however, half of the light quantity loss is generated by the beam splitter. Therefore, utilization efficiency of the laser beam for recording is low.

SUMMARY OF INVENTION

In consideration of such a respect, it is an object of the invention to propose an optical pick-up device capable of reducing a light quantity loss by using a common optical system and a common light receiving element, thereby properly reproducing a CD and a DVD and performing record on the CD.

In order to solve the problems, the invention provides an optical pick-up device comprising a first semiconductor laser for emitting a first laser beam, a second semiconductor laser for emitting a second laser beam having a different wavelength from that of the first laser beam, an objective lens for causing the first and second laser beams to converge as light spots on an optical recording medium, a common light receiving element for receiving a return light sent from the optical recording medium, and first and second beam splitters, the first laser beam being guided to the objective lens through the first and second beam splitters, the second laser beam being guided to the objective lens through the second beam splitter and the return light being guided to the common light receiving element through the first and second beam splitters, wherein the first beam splitter has a reflectance set within approximately 70% to 90% for the first laser beam and is set to a full transmittance for the second laser beam, and the second beam splitter is set to a full transmittance for the first laser beam and has a reflectance set within approximately 20% to 60% for the second laser beam.

In the optical pick-up device according to the invention, the first laser beam is reflected by the first beam splitter having a high reflectance with respect to the laser beam and is then guided to the optical recording medium side. Accordingly, the quantity of light of the first laser beam irradiated on the optical recording medium can be maintained sufficiently. Accordingly, it is possible to implement a reliable recording operation by using the first laser beam for recording on the optical recording medium.

For the first and second beam splitters, it is desirable that the first laser beam should be set to be one of P and S polarized lights and the second laser beam should be set to be a polarized light orthogonal to the first laser beam or to include both P and S polarization components for the first and second beam splitters.

If a direction of polarization of the laser beam is thus set, the first and second beam splitters having the optical characteristic can be implemented inexpensively. In general, it is preferable that the second laser beam should be set to include the P polarization component set within approximately 30% to 70% and the S polarization component set within the remaining part.

If the direction of polarization is thus set, an elliptical light spot of the first laser beam and an elliptical light spot of the second laser beam are formed on the optical recording medium with an inclination of approximately 45 degrees. Accordingly, both of the light spots can be formed to have an arrangement relationship suitable for recording and reproduction in a direction of a tangent of a recording track of the optical recording medium.

The first laser beam can serve to carry out recording on the optical recording medium and the second laser beam can serve to carry out reproduction of the optical recording medium.

In this case, it is desirable that a direction of a major axis of the elliptical light spot of the first laser beam which is formed on the optical recording medium should be set to be coincident with a radial direction of the optical recording medium. Thus, the elliptical light spot of the first laser beam has a minor axis direction coincident with a recording pit direction. Therefore, resolving power can be enhanced.

DETAILED DESCRIPTION OF PREFERRED EMBODIMENTS

An optical pick-up device according to an embodiment of the invention will be described below with reference to the drawings. The optical pick-up device which will be described below is of a 2-light source type which reproduces a CD and a DVD and caries out recording on a CD-R/RW.

Figure 1:
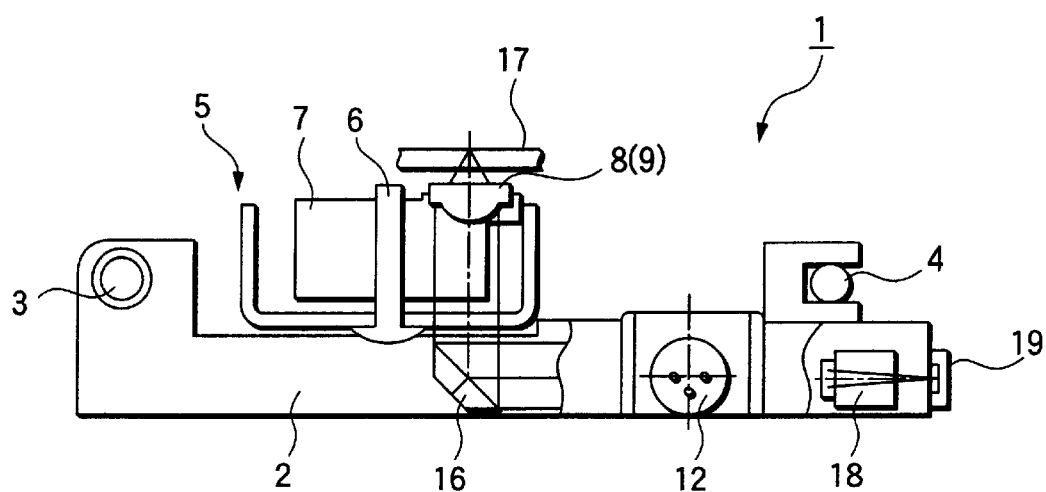
FIG. 1 is a sectional view showing a structure of an optical pick-up device according to the invention.
Figure 2A:
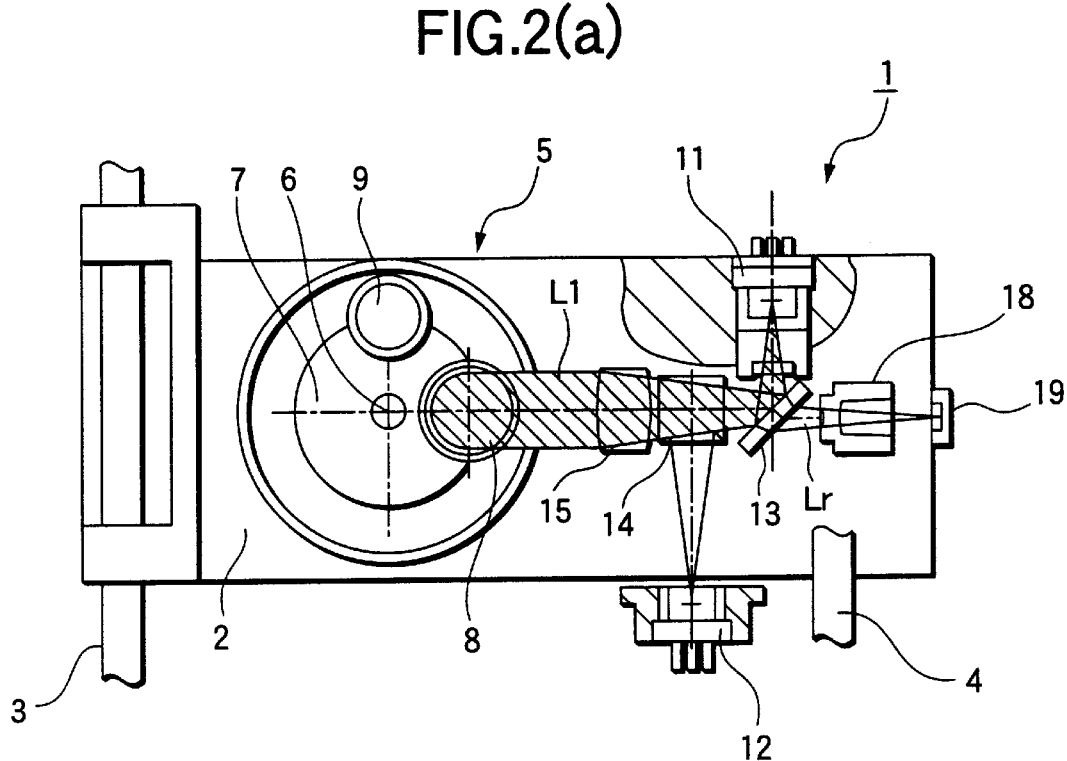
FIG. 2(a) is a plan view showing a state in which a light source for a CD is used and FIG. 2(b) is a plan view showing a state in which a light source for a DVD is used in the optical pick-up device of FIG. 1.
Figure 2B:
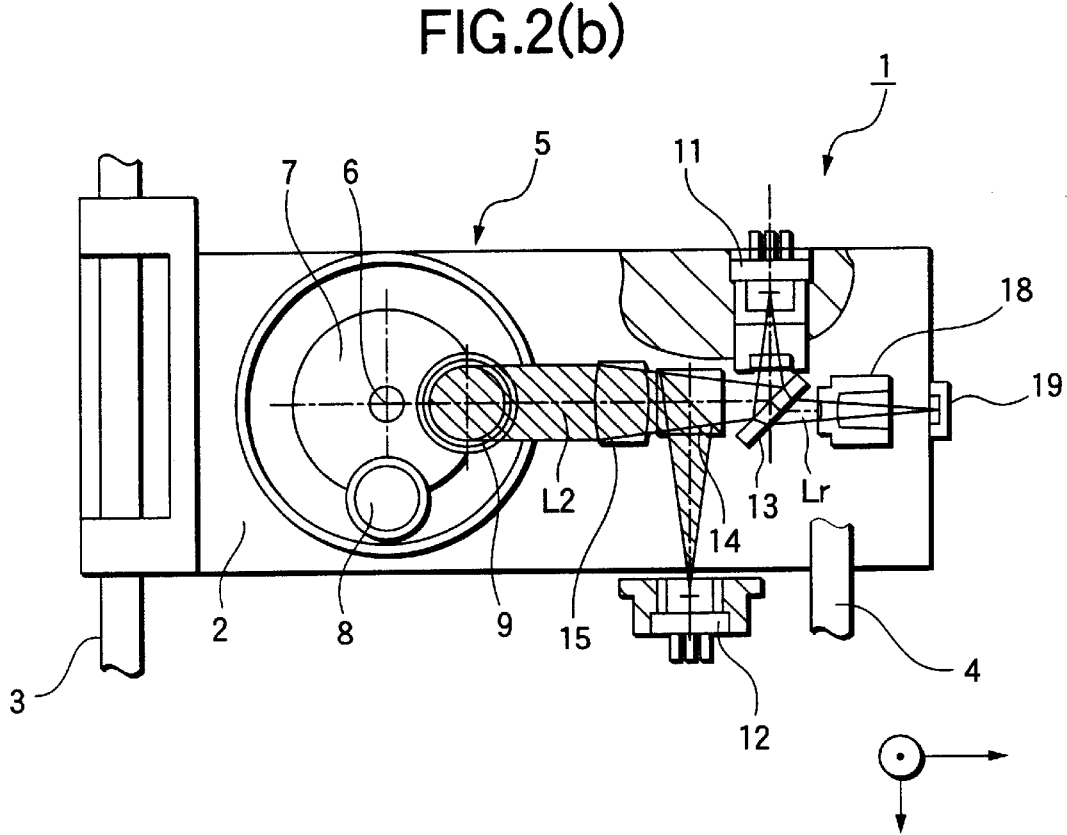

FIG. 1 is a view showing a side structure of the optical pick-up device of the 2-light source type according to the embodiment. FIG. 2(a) is a plan view showing a state in which a light source for a CD is used, and FIG. 2(b) is a plan view showing a state in which a light source for a DVD is used. A shown in these drawings, an optical pick-up device 1 according to the embodiment has a base 2. The base 2 is slidably attached in the radial direction of an optical recording medium along two guide shafts 3 and 4 fixed in parallel with a device frame (not shown).

An objective lens driving mechanism 5 is mounted on the base 2. The objective lens driving mechanism 5 according to the embodiment is of a shaft sliding and rotating type comprising a lens holder 7 which can be slid along a sliding shaft 6 and can be rotated around the sliding shaft 6. An objective lens 8 for a CD and an objective lens 9 for a DVD are mounted on the lens holder 7 at an interval of 90 degrees. When the lens holder 7 is rotated by a magnetic driving circuit which is not shown, one of the objective lenses 8 and 9 can be switched into a use position.

An optical system of the optical pick-up device 1 which is provided in the base 2 according to the embodiment has a first semiconductor laser 11 for emitting a first laser beam L1 for CD recording which has high power and a wavelength of 780 nm and a second semiconductor laser 12 for emitting a second laser beam L2 for DVD reproduction which has a wavelength of 650 nm or 670 nm. These semiconductor lasers 11 and 12 are provided opposite to each other such that principal optical axes of the laser beams are emitted in parallel with each other.

A half mirror 13 acting as a first beam splitter, a prism 14 acting as a second beam splitter, a collimate lens 15 and a rising mirror 16 are arranged in this order between the semiconductor lasers 11 and 12 toward the objective lens 8 or 9 set in the use position in a direction orthogonal to the optical axes of the emitted laser beams. Moreover, the back face side of the half mirror 13 is provided with a sensor lens 18 for giving an aberration for servo signal generation to a return light Lr transmitted from an optical recording medium 17 and a common light receiving element 19 for receiving the return light to which the aberration is given.

A reflective film of the half mirror 13 is inclined at 45 degrees with respect to the principal optical axis of the laser in an opposite position to the first semiconductor laser 11. Similarly, a reflective film of the prism 14 is inclined at 45 degrees with respect to the principal optical axis of the laser in an opposite position to the second semiconductor laser 12.

Accordingly, when the objective lens 8 for a CD is switched into the use position to drive the first semiconductor laser 11 and emit the first laser beam L1 as shown in FIG. 2(a), the first laser beam L1 is partially reflected by the half mirror 13 and is transmitted through the prism 14, is changed into a parallel light through the collimate lens 15 and is then raised toward the objective lens 8 by the rising mirror 16 and converges as a light spot on the recording plane of the optical recording medium (a CD in this case) through the objective lens 8 as shown in a slant line of FIG. 2. The return light Lr reflected by the optical recording medium 17 is returned to the half mirror 13 through the same path, is partially transmitted therethrough and is irradiated on the light receiving element 19 through the sensor lens 18.

Similarly, when the objective lens 9 for a DVD is switched into the use position to drive the second semiconductor laser 12 and emit the second laser beam L2 as shown in FIG. 2(b), the second laser beam L2 is partially reflected by the reflective film of the prism 14, is changed into a parallel light through the collimate lens 15 and is then raised toward the objective lens 9 by the rising mirror 16 and converges as a light spot on the recording plane of the optical recording medium (a DVD in this case) 17 through the objective lens 9 as shown in a slant line of FIG. 3. The return light Lr reflected by the optical recording medium 17 is returned to the prism 14 through the same path, is partially transmitted therethrough and further through the half mirror 13, and is irradiated on the light receiving element 19 through the sensor lens 18.

Figure 3A:
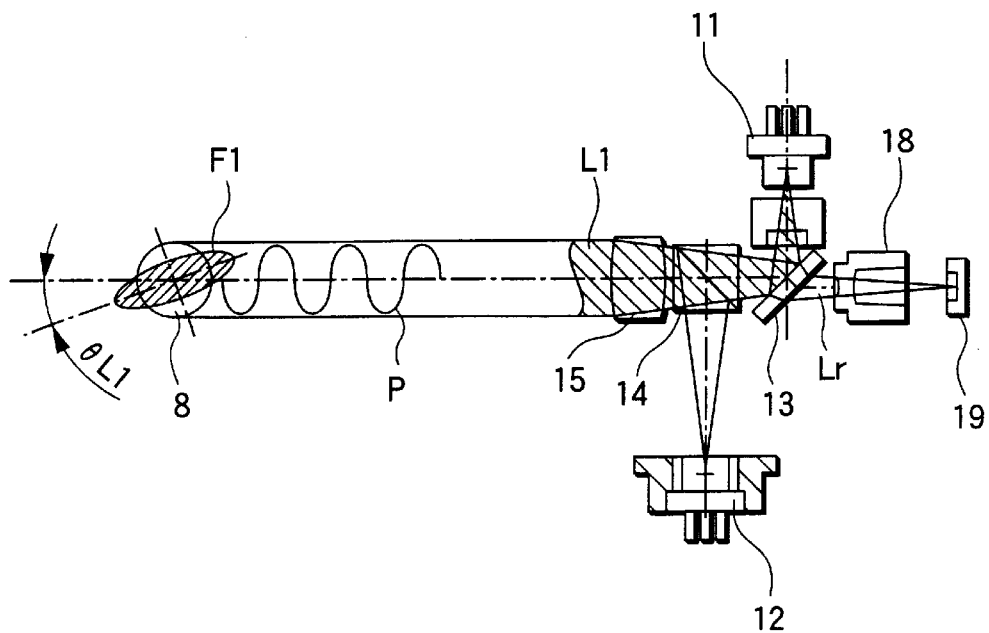
FIG. 3(a) is a view illustrating a direction of polarization of a first laser beam for a CD and a state of a light spot to be formed in the optical pick-up device of FIG. 1.
Figure 3B:
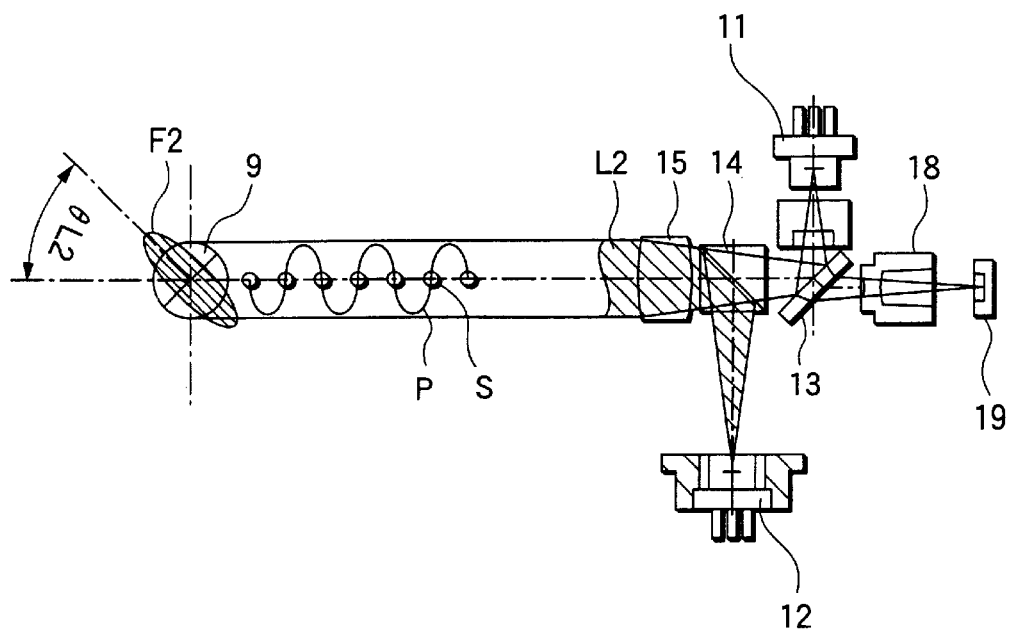
FIG. 3(b) is a view illustrating a direction of polarization of a second laser beam for a DVD and a state of a light spot to be formed in the optical pick-up device of FIG. 1.

In the embodiment, as shown in FIGS. 3(a) and 3(b), the first semiconductor laser 11 for CD recording is adjusted around the optical axis. Consequently, the first laser beam L1 is set to be a P polarized light with respect to the half mirror 13 and the prism 14. On the other hand, the second semiconductor laser 12 for DVD reproduction is adjusted around the optical axis. Consequently, the second laser beam L2 is set to be a polarized light including a P polarization component set approximately at 50% and an S polarization component also set approximately at 50% with respect to the half mirror 13 and the prism 14.

By such setting, an elliptical light spot F1 of the first laser beam L1 is formed on the objective lens 8 with a major axis thereof inclined by θL1 with respect to an optical axis L of an optical system (an optical axis of a system). On the other hand, an elliptical light spot F2 of the second laser beam L2 is formed on the objective lens 9 with a major axis thereof inclined by θ L2 with respect to the optical axis L, and is inclined at an angle of approximately 45 degrees with respect to the light spot F1.

Figure 4A:
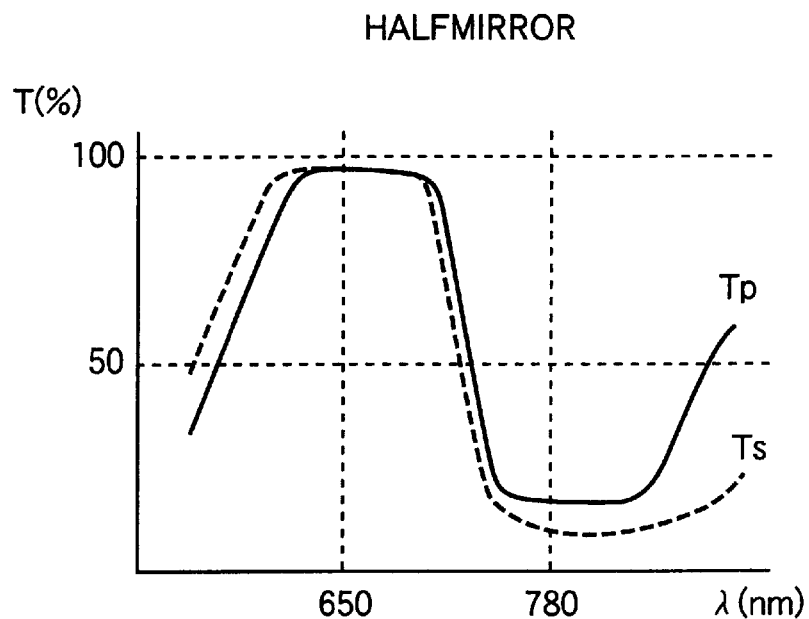
FIG. 4(a) is a graph showing a polarization characteristic of a half mirror in the optical pick-up device of FIG. 1
Figure 4B:
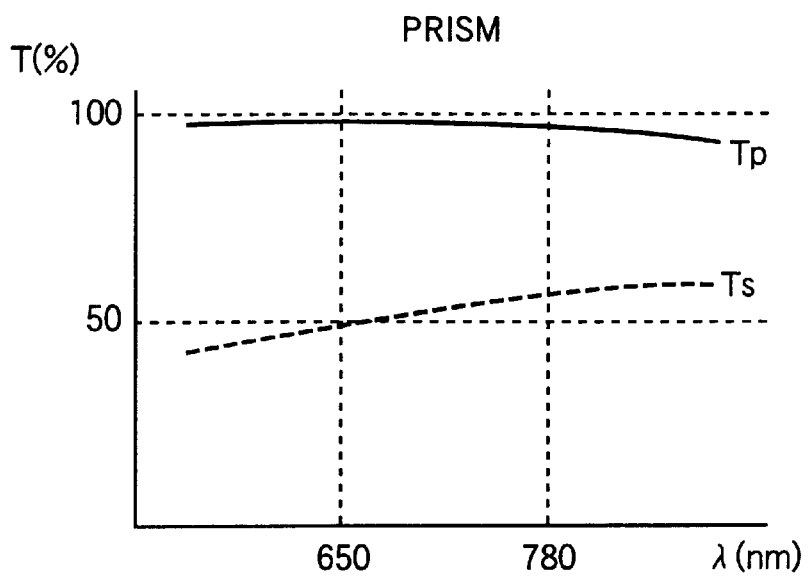
FIG. 4(b) is a graph showing a polarization characteristic of a prism in the optical pick-up device of FIG. 1.

In the embodiment, the optical characteristics (transmittance and reflectance) of the half mirror 13 and the prism 14 are set as shown in FIGS. 4(a) and 4(b). As shown in FIG. 4(a), first of all, the reflective film characteristic of the half mirror 13 has a transmittance set approximately at 20% for the laser beam L1 having a CD wavelength of 780 nm and is substantially set to a full transmitting characteristic for the laser beam L2 having a DVD wavelength of 650 nm or 670 nm as shown in a solid line for the P polarized light. Similarly, the S polarized light has substantially the same characteristic as that of the P polarized light as shown in a broken line.

On the other hand, as shown in FIG. 4(b), the reflective film characteristic of the prism 14 is substantially set to a full transmitting characteristic for the laser beam L1 having a CD wavelength of 780 nm and the laser beam L2 having a DVD wavelength of 650 nm or 670 nm as shown in a solid line for the P polarized light. For the S polarized light, a transmittance is set approximately at 50% and a reflectance is set approximately 50% as shown in a broken line.

In the optical pick-up device 1 according to the embodiment, therefore, approximately 80% (100% to 20%) of the first laser beam L1 for a CD which is the P polarized light is reflected by the half mirror 13 and the reflected laser beam L1 is transmitted through the prism 14 and converges as a light spot on the optical recording medium 17 through the objective lens 8. Accordingly, the light spot can be formed on the optical recording medium in a sufficient light quantity with a smaller light quantity loss than that in the conventional art. Therefore, recording on the CD can be carried out well. The return light Lr sent from the optical recording medium is transmitted through the prism 14, approximately 20% thereof is transmitted through the half mirror 13 and is returned to the light receiving element 19. Consequently, a servo signal can also be generated reliably.

On the other hand, the second laser beam L2 for a DVD including the P polarization component and the S polarization component has a transmittance and a reflectance in the prism 14 which is a mean value of that of the P polarization component and that of the S polarization component. In the embodiment, therefore, a transmittance at approximately 75% is obtained as is apparent from a graph of FIG. 4(b). Accordingly, 25% (100–75%) of the second laser beam L2 is reflected by the prism 14 and is irradiated on the recording plane of the optical recording medium 17 through the objective lens 9. In this case, it is preferable that a reproducing operation should be carried out. Therefore, a sufficient light quantity can be obtained. 75% of the return light Lr sent from the optical recording medium 17 is transmitted through the prism 14, is transmitted through the half mirror 13 and is guided to the light receiving element 19. Accordingly, a quantity of a light received by the light receiving element 19 is also enough for generating reproduction information and a servo signal.

Upon, as described above, in this embodiment, the reflectance is set approximately 20% with respect the first laser beam L1. However, this invention is not limited by this embodiment. According to the experiments of the inventors, it has been confirmed that a reflectance for the first laser beam is desirably set to approximately 70% to 90% as the reflective film characteristic of the half mirror 13. At setting the range described above, the calculation is based on a quantity of light reached to the receiving element 19. For example, when the reflectance is set approximately at 100% (transmittance 0%), a quantity of light of the laser beam L1 directed to the optical recording medium 17 becomes in large, the return light Lr from the optical recording medium 17 seldom passes through the half mirror 13. Thus, a quantity of light reached to the receiving element 19 is in little. Therefore, the it is difficult for the receiving element 19 to detect the quantity of light. Further, if the quantity light reached to the receiving element 19 is too small, the influence caused by unevenness (dispersion) of the half mirror under the condition of the wavelength, manufacture, temperature or the like becomes in large. Thus, the reflectance for the first laser L1 is set at approximately within 70% to 90% in the consideration of the quantity light reached to the receiving element 19 and unevenness (dispersion) described above. Moreover, it has been confirmed that a reflectance for the second laser beam is desirably set to approximately within 20% to 60%. This range is also set in the consideration of the quantity light reached to the receiving element 19 and unevenness (dispersion) described above.

In the optical pick-up device 1 according to the embodiment, the first laser beam L1 for CD recording is set to be the P polarized light and the second laser beam L2 for DVD reproduction is set to be the polarized light including the P polarization component set at approximately 50% and the S polarization component set at approximately 50%. As a result, the light spot F1 for recording and the light spot F2 for reproduction are formed on the objective lenses with an inclination of approximately 45 degrees as described above with reference to FIGS. 3(a) and 3(b).

Figure 5A:
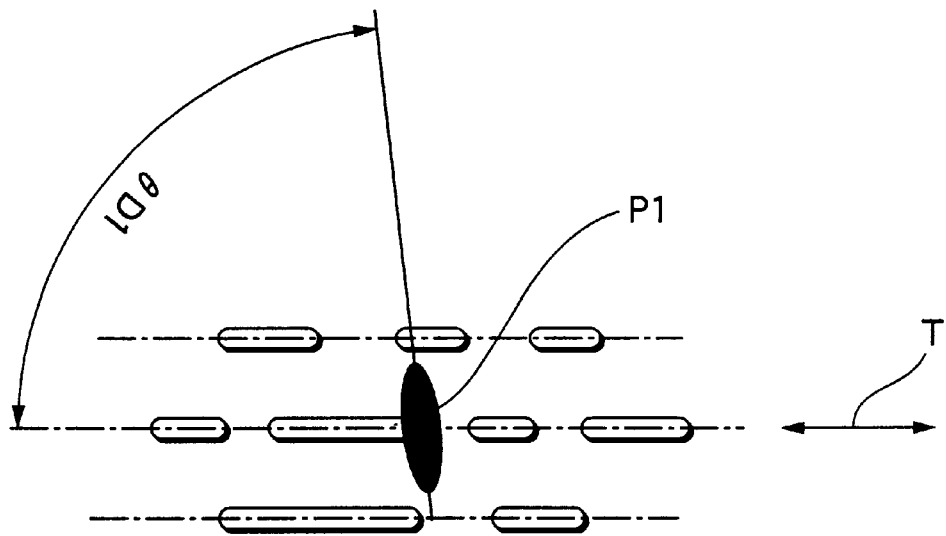
FIGS. 5(a) and (b) are views illustrating a relationship between a light spot formed on an optical recording medium and a recording track.
Figure 5B:
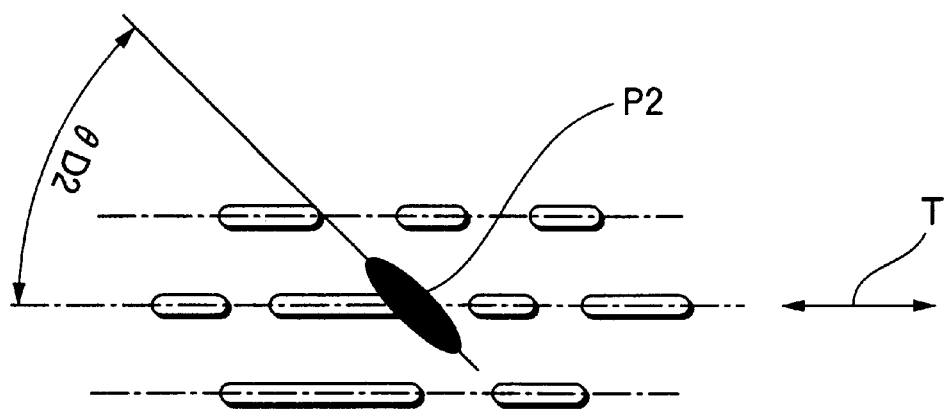

In this case, the light spot P1 for recording and the light spot P2 for reproduction are formed on the recording plane of the optical recording medium 17 with a rotation of 90 degrees with respect to the light spots formed on the objective lenses respectively as shown in FIGS. 5(a) and 5(b). Accordingly, if the light spot P1 for recording is set into a direction suitable for a recording mark, that is, a direction orthogonal to a recording track T on the recording plane, the light spot P2 for reproduction is inclined at 45 degrees with respect to the recording track T so that it is set to a direction which is advantageous to reproducing characteristics including a lens shift characteristic. According to the embodiment, consequently, the recording and reproducing operations can be carried out reliably.

As described above, in this embodiment, the second laser beam L2 is set to be the polarized light including the P polarization component set at approximately 50% and the S polarization component set at approximately 50%. This invention is not limited by this embodiment. The second laser beam for DVD reproduction is set to perform DVD reproduce jitter (recorded information reading accuracy) without the bad influence. According to the experiments of the inventors, P polarization component sets at approximately 30% to 70% and the S polarization component set at the remaining part. While the first laser beam is the P polarized light in the embodiment, it can also be the S polarized light. In this case, it is preferable that the reflective film characteristics of the half mirror 13 and the prism 14 should be set to have transmittance and reflectance characteristics corresponding thereto.

As described above, the invention provides an optical pick-up device of a plural light source type having such a structure that the first and second laser beams are guided to the optical recording medium through the common optical system and the return light sent from the optical recording medium is also guided to the common light receiving element through the common optical system, wherein the reflectance of the first laser beam in the first beam splitter for reflecting the first laser beam to be guided to the optical recording medium is set to approximately 70% to 90%. Accordingly, it is possible to lessen the light quantity loss of the first laser beam to be guided to the optical recording medium. In particular, in the case in which the first laser beam is used for recording, the light spot can be formed in a sufficient light quantity on the optical recording medium. At the same time, the return light sent back to the light receiving element is also enough for servo signal generation. Accordingly, a reliable recording operation can be implemented.

In the invention, moreover, one of the laser beams is the P or S polarized light and the other laser beam is the polarized light having the P polarization component and the S polarization component mixed. Therefore, it is possible to inexpensively implement the reflective film characteristics of the first and second beam splitters for guiding each laser beam to the optical recording medium and guiding the return light thereof to the light receiving element. Furthermore, the elliptical light spots can be formed on the optical recording medium through the first and second laser beams 1 and 2 at an angle of approximately 45 degrees. Therefore, it is possible to form a light spot in a suitable state for recording and reproduction.

What is claimed is:

1. An optical pick-up device comprising:
   a first semiconductor laser for emitting a first laser beam;
   a second semiconductor laser for emitting a second laser beam having a different wavelength from that of the first laser beam;
   an objective lens for causing the first and second laser beams to converge as light spots on an optical recording medium;
   a common light receiving element for receiving a return light sent from the optical recording medium, and
   first and second beam splitters, the first laser beam being guided to the objective lens through the first and second beam splitters, the second laser beam being guided to the objective lens through the second beam splitter and the return light being guided to the common light receiving element through the first and second beam splitters,
   wherein the first beam splitter has a reflectance set within approximately 70% to 90% for the first laser beam and is set to a full transmittance for the second laser beam, and
   wherein the second beam splitter is set to a full transmittance for the first laser beam and has a reflectanceset within approximately 20% to 60% for the second laser beam.

2. The optical pick-up device according to claim 1, wherein the first laser beam is set to be one of P and S polarized lights and the second laser beam is set to be a polarized light orthogonal to the first laser beam or to include P and S polarization components for the first and second beam splitters.

3. The optical pick-up device according to claim 2, wherein the second laser beam is set to include the P polarization at approximately 30% to 70% and S polarization components at remaining part.

4. The optical pick-up device according to any of claims 1 to 3, wherein an elliptical light spot of the first laser beam which is formed on the optical recording medium is set to be inclined at 45 degrees with respect to an elliptical light spot of the second laser beam.

5. The optical pick-up device according to any of claims 1 to 4, wherein the first laser beam serves to carry out recording on the optical recording medium and the second laser beam serves to carry out reproduction of the optical recording medium.

6. The optical pick-up device according to claim 5, wherein a direction of a major axis of the elliptical light spot of the first laser beam which is formed on the optical recording medium is coincident with a radial direction of the optical recording medium.

7. An optical pick-up device comprising:
   a first semiconductor laser for emitting a first laser beam;
   a second semiconductor laser for emitting a second laser beam having a different wavelength from that of the first laser beam;
   an objective lens for causing the first and second laser beams to converge as light spots on an optical recording medium;
   a common light receiving element for receiving a return light sent from the optical recording medium, and
   first and second beam splitters, the first laser beam being guided to the objective lens through the first and second beam splitters, the second laser beam being guided to the objective lens through the second beam splitter and the return light being guided to the common light receiving element through the first and second beam splitters,
   wherein the first semiconductor laser used for recording the information, and the first beam splitter is set under the condition that a reflectance is larger than a transmittance for the first semiconductor laser and a full transmittance is set for the second laser beam.

* * * * *